May 16, 1933. A. GROBARD 1,909,269
BOTTLE HOLDER
Filed Aug. 31, 1932
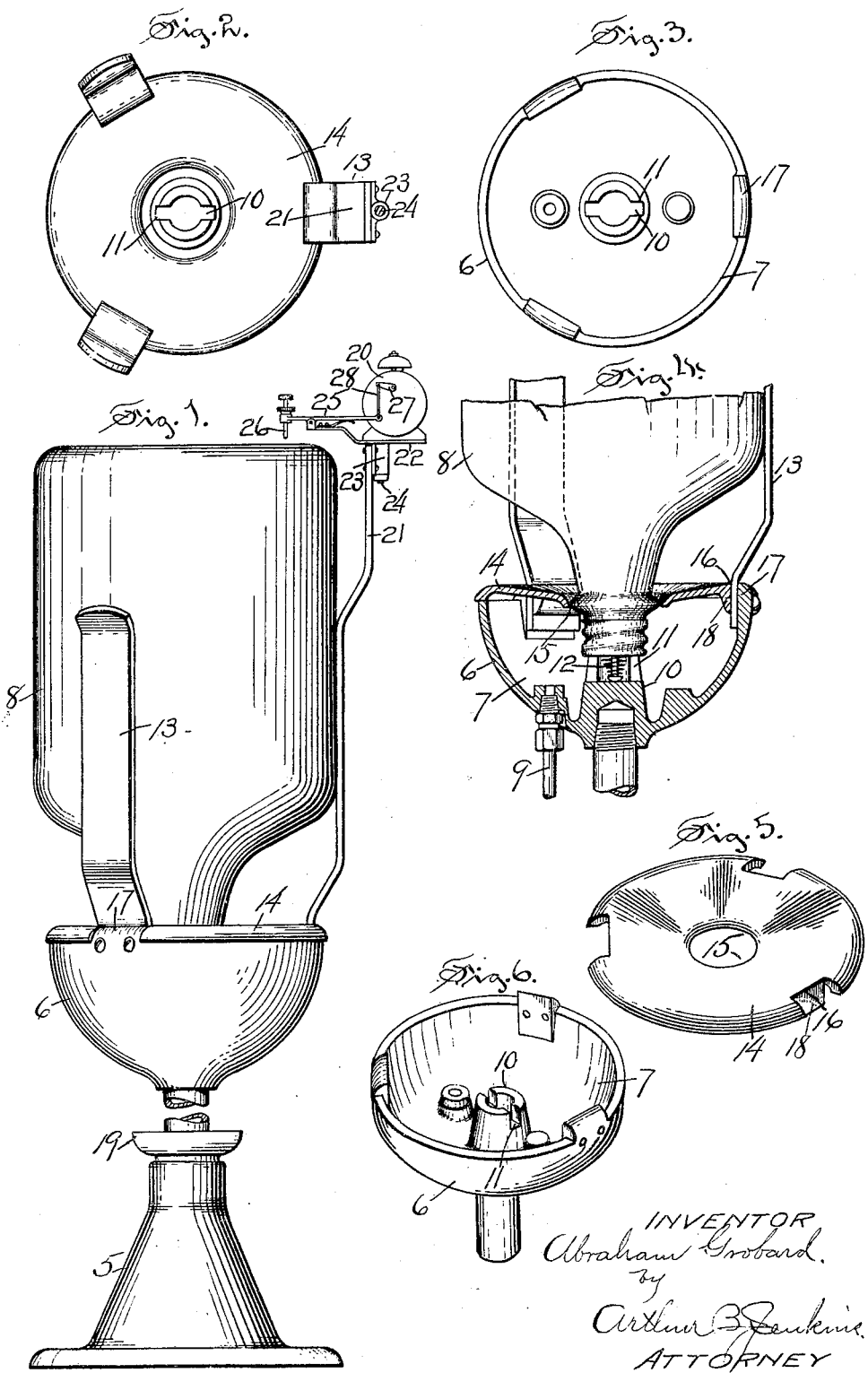

Patented May 16, 1933

1,909,269

UNITED STATES PATENT OFFICE

ABRAHAM GROBARD, OF HARTFORD, CONNECTICUT, ASSIGNOR TO THE IDEAL OIL BURNER COMPANY, OF HARTFORD, CONNECTICUT, A CORPORATION OF CONNECTICUT

BOTTLE HOLDER

Application filed August 31, 1932. Serial No. 631,219.

My invention relates to the class of devices that are commonly employed for holding large bottles in an inverted position for the controlled supply therefrom into a receptacle, and an object of my invention, among others, is to provide a holder of this type that shall be simple in construction and particularly efficient for the purposes for which it is designed.

One form of a holder embodying my invention and in the construction and use of which the objects herein set out, as well as others, may be attained is illustrated in the accompanying drawing, in which—

Figure 1 is a view in side elevation of my improved holder with the central portion broken out.

Figure 2 is a top view of the same with the bottle removed and a portion of the alarm mechanism omitted.

Figure 3 is a similar view with the cover to the receptacle removed.

Figure 4 is a view in central vertical section through the receptacle showing the lower part of a bottle in place therein.

Figure 5 is an isometric view of the cover for the receptacle.

Figure 6 is an isometric view of the receptacle.

While my invention is not limited in the uses to which it may be put, yet as it is particularly applicable for use in connection with devices for supplying oil to oil burners, and especially for household use, such has been selected by me for the purpose of disclosure of my invention herein.

In the accompanying drawing the numeral 5 denotes the base of a standard that may be of any suitable material and of any desired form, said base supporting at its upper end a receptacle 6 preferably of bowl shape and having a chamber 7 therein to receive oil or other liquid as from a bottle 8 supported in an inverted position and with its mouth located in said chamber. A supply pipe 9 extends from the bottom of the bowl to any suitable device for supply, this pipe being of any suitable form and being attached to the bowl in any suitable manner. A rest 10 projects upwardly from the bottom of the bowl or receptacle to receive the end of the bottle 8, said rest having oppositely disposed notches 11 within which the stem 12 of a valve is located, the head of the stem resting upon the rest 10, and as shown in Fig. 4 of the drawing. This valve is of old and well known construction, common to bottles of this type, and a further and detailed description is therefore omitted herein, it being sufficient to state that when the bottle is inverted the head of the stem pressing against the rest 10 opens the valve to allow delivery of liquid contents of the bottle into the chamber 7.

In order to support the bottle in an upright position spring fingers 13 are provided which are secured at their lower ends within the chamber 7 of the receptacle and project upwardly, three of these fingers preferably being provided, although more may be supplied if desired. These fingers may be secured in any suitable manner, as by means of screws, as shown in Figs. 1 and 4.

A cover 14 is fitted to the upper end of the receptacle 6, this cover having a central opening 15 through which the mouth of the bottle projects. The cover has notches 16 in its edge through which the fingers 13 project and the cover thereby constitutes a support for the fingers 13 to hold them rigidly in place when serving to support a bottle 8. This is particularly true when considered in connection with lugs 17 projecting upwardly from the edge of the receptacle, which lugs are received within said notches, and the fingers 13 being located between the inner sides of the lugs, to which they are secured, and the bottoms of the notches. Lugs 18 project from the under side of the cover and rest against the lower ends of the fingers 13 and thereby serve to support, in connection with the lugs 17, the fingers rigidly in place. A catch cup 19 is secured to the standard, preferably just above the upper edge of the base 5, this cup serving to catch any oil that may drip or flow from the receptacle 14.

The fingers perform an important function in the operation of the device in that they insure the placing of the bottle in an upright position when it is being inserted in place, as, if the bottle is not retained in a substantially upright position, but is placed in an inclined position, the valve becomes unseated to a greater or lesser extent and the contents of the bottle are therefore apt to drip from the mouth of the bottle before it is placed in position. The fingers being open for their whole length, the bottle may be readily manipulated for insertion in place, or for removal from the receptacle.

In order to indicate the fact that the bottle is empty, or nearly so, I have provided an alarm mechanism that will perform this function. In carrying out my purpose I make use of the spring 12 and so construct it that it will be strong enough to lift the bottle 8 when the latter is partially relieved of its contents. In the preferred form of mechanism, and as herein shown, an alarm clock 20 is associated with the bottle so that the latter when lifted will set the alarm mechanism in operation. While I have shown the alarm clock as a satisfactory means for effecting my purpose, other forms of indicators may be employed and which will be operated by the bottle in the upward movement thereof hereinbefore referred to.

In the present instance I extend one of the fingers 13, as at 21, and mount a shelf 22 thereon, said shelf having a sleeve 23 rotatably mounted on a spindle 24 secured to the extension 21. An alarm actuating lever 25 is pivotally mounted on an extension from the shelf 22, said lever having a finger 26 located in the path of movement of the bottle 8 in its upward movement hereinbefore referred to. The end of the lever opposite the finger 26 is connected as by a link 28 with an alarm lever 27 secured to the projecting end of a spindle from within the clock, which spindle controls the operation of the alarm. The finger 26 is adjustably mounted in the end of the lever 25, as shown in Fig. 1, so that the time of operation of the alarm may be varied to operate with different amounts of liquid within the bottle, as may be desired.

The operation of this apparatus will be readily understood, it being noted that as the bottle becomes lighter owing to the outflow of liquid therefrom, the spring 12 will operate to slowly raise the bottle until it touches the finger 26 and as the bottle continues to raise the alarm will be released and by its sounding will denote the state of the liquid within the bottle. The valve within the mouth of the container or bottle will have sufficient movement to prevent its being entirely closed when the bottom of the bottle comes in contact with the finger 26.

I claim—

1. A bottle holder comprising a receptacle, a cover fitting the open end of said receptacle and having an aperture for the neck of a bottle and notches in its edge, and fingers secured to the inner wall of the receptacle and projecting outwardly through said notches in the cover to engage the sides of the bottle and hold it upright.

2. A bottle holder comprising a receptacle, said receptacle having lugs projecting from its upper edge, a cover fitting the open end of said receptacle and having an aperture for the neck of a bottle and notches to receive said lugs, and fingers secured to the inner wall of the receptacle and projecting outwardly through said notches in the cover to engage the sides of the bottle and hold it upright.

3. A bottle holder comprising a receptacle, a cover fitting the open end of said receptacle and having an aperture for the neck of a bottle and notches in its edge, lugs projecting downwardly from the cover at the bottoms of said notches, and fingers secured to the inner wall of the receptacle and projecting outwardly through said notches in contact with said lugs to engage the sides of the bottle and hold it upright.

4. A bottle holder comprising a receptacle, a cover fitting the open end of said receptacle and having an aperture for the neck of a bottle and notches in its edge, lugs projecting from the under side of the cover adjacent the bottom of said notches, lugs projecting from the edge of the receptacle to be received in said notches, and fingers secured to the inner wall of the receptacle and projecting outwardly through the notches in the cover between the lugs on the cover and those on the edge of the receptacle to engage the sides of the bottle and hold it upright.

5. A bottle holder comprising a receptacle, a standard to support said receptacle, a cup surrounding said standard to catch overflow from the receptacle, a cover fitting the open end of the receptacle and having an aperture, and fingers projecting upwardly from the receptacle to support a bottle in inverted position with its end projecting through the aperture in the cover.

6. A bottle holder comprising a receptacle, means for supporting a container on said receptacle, means for lifting the container, a support upheld by said container, and an alarm mechanism including a member located on said support in the path of movement of said container to be operated thereby in its upward movement.

7. A bottle holder comprising a receptacle, means for supporting a container in inverted position on said receptacle, a valve to control outflow of liquid from the container, said valve having a closing spring of a strength sufficient to raise the bottle when partially emptied, and an alarm mechanism including a member located in the path of movement of said container to be operated thereby in its upward movement.

8. A bottle holder comprising a receptacle, means for supporting a container on said receptacle, means for lifting said container, a shelf pivotally mounted on said supporting means for the container, and an alarm mechanism including a member located in the path of movement of said container to be operated thereby in its upward movement, said alarm mechanism being supported on said shelf.

9. A bottle holder comprising a receptacle, means for supporting a container on said receptacle, a finger projecting upwardly from the receptacle, means for lifting the container, a support secured to the upper end of said finger, and an alarm mechanism including a member located on said support in the path of movement of said container to be operated thereby in its upward movement.

10. A bottle holder comprising a receptacle, means for supporting a container on said receptacle, means for lifting the container, a finger projecting upwardly from the container, a support pivotally mounted on said finger, and an alarm mechanism including a member located on said support in the path of movement of said container to be operated thereby in its upward movement.

ABRAHAM GROBARD.